United States Patent [19]

Lühmann

[11] Patent Number: 5,409,189

[45] Date of Patent: Apr. 25, 1995

[54] REDETACHABLE, SELF-ADHESIVE HOOK

[75] Inventor: Bernd Lühmann, Norderstedt, Germany

[73] Assignee: Beiersdorf AG, Hamburg, Germany

[21] Appl. No.: 122,823

[22] Filed: Sep. 14, 1993

[30] Foreign Application Priority Data

Sep. 30, 1992 [DE] Germany .............. 42 32 709.1
Oct. 8, 1992 [DE] Germany .............. 42 33 872.7

[51] Int. Cl.⁶ ............................................. A47G 1/17
[52] U.S. Cl. ........................... 248/205.3; 156/313; 248/304; 428/43
[58] Field of Search ............... 248/205.3, 304, 301; 156/313; 428/43, 41

[56] References Cited

U.S. PATENT DOCUMENTS

| | | | |
|---|---|---|---|
| 2,420,045 | 5/1947 | Krug. | |
| 3,241,795 | 3/1966 | Frye | 248/205.3 X |
| 3,260,372 | 7/1966 | Jauslin | 248/205.3 X |
| 3,458,946 | 8/1969 | Lasswell | 248/205.3 X |
| 3,637,181 | 1/1972 | Janssen | 248/205.3 |
| 4,040,522 | 8/1977 | Vickery. | |
| 4,310,137 | 1/1982 | Frye | 248/205.3 |
| 4,599,263 | 7/1986 | Anderson. | |
| 4,605,577 | 8/1986 | Bowytz | 156/313 X |
| 4,671,480 | 6/1987 | Frye | 248/205.3 |
| 4,736,917 | 4/1988 | Thuresson | 248/205.3 |
| 4,756,498 | 7/1988 | Frye | 248/205.3 |

FOREIGN PATENT DOCUMENTS

| | | |
|---|---|---|
| 456472 | 5/1991 | European Pat. Off. . |
| 2642121 | 3/1978 | Germany . |
| 2824811 | 12/1978 | Germany . |
| 2909276 | 9/1980 | Germany . |
| 3121685 | 1/1983 | Germany . |
| 3331016 | 10/1984 | Germany . |
| 3714453 | 4/1987 | Germany . |

Primary Examiner—Ramon O. Ramirez
Assistant Examiner—Korie H. Chan
Attorney, Agent, or Firm—Sprung Horn Kramer & Woods

[57] ABSTRACT

Redetachable, self-adhesive hook or similar fixing device, characterized by a strip (1) of an adhesive film for reseparable bonding based on a thermoplastic rubber and tackifying resins, wherein the adhesive film has high elasticity and low plasticity and wherein the adhesion is lower than the cohesion, the adhesive power largely disappears on extension of the film, the ratio of the peel strength to the tear load is at least 1:1.5, and wherein an adhesive bond produced with this can be separated by pulling on the adhesive film in the direction of the adhesion plane, wherein one end of the strip (1) is provided on both sides with a covering (4), which at the same time serves as a tab for pulling, wherein at least the covering (4) located on the front side is opaque to UV and wherein the front side of the strip (1) carries, except for in the region of the covering (4), a baseplate (3) having a peg-shaped extension (2) pointing forwards, and the reverse of the strip (1) is covered with a release paper or a release film (5) which has a tab (6) in the region of the covering (4).

10 Claims, 1 Drawing Sheet

REDETACHABLE, SELF-ADHESIVE HOOK

The invention relates to a redetachable, self-adhesive hook or a similar fixing device.

BACKGROUND OF INVENTION

Self-adhesive hooks are well known. On the other hand, redetachable hooks of this type which also adhere permanently and firmly are not known. The removal of stuck-on hooks, for example from tiles in the bathroom or in the kitchen, however, is an undertaking in which the substrate can easily be damaged.

Adhesive films for reseparable adhesive bonds which allow an adhesive bond produced with the film to be separable by pulling on the adhesive film in the direction of the adhesion plane are known from DE-OS 33 31 016. High adhesive strength and shear strength can be achieved with such adhesive films, and adhesive bonds can be separated again without further aids, comparable to opening a zip fastener, or even better comparable to opening a preserving jar: the rubber seal is pulled out of the sealing joint by the tab.

In practice, however, considerable disadvantages have manifested themselves when such adhesive films are used. On the one hand, it is a product which requires explanation. Those who have not previously used such an adhesive film easily tend to stick the components of the joint to one another in such a way that the adhesive film disappears between the components of the joint and no longer projects out so that it can no longer be pulled on: irreversible bonding is the consequence, with corresponding disappointment. However, the disappointment is just as great if, when used correctly, the adhesive film then tears when pulled on: here also an irreversible bonding is the consequence. The advantage of a reseparable adhesive bond which can be achieved without damage to the components of the joint in the simplest manner merely by pulling turns into a drastic disadvantage, since precisely the components of the joint which are to be separated again are now bonded permanently. The only course is usually to destroy the components of the joint.

The inventors of DE-OS 33 31 016 also recognized the problem of tearing during pulling and paid it particular attention. On page 4, centre, there is accordingly a certain ratio of peel strength to tear load: the tear load should always be greater than the peel strength, and for safety reasons the peel strength should be in a ratio of 1:2 to 1:3 to the tear load.

In practice, however, it has been found that this precaution is often not sufficient. Substrates bonded on an exhibition site, which are to be separated again after the end of the exhibition, can no longer be separated because of tears. This is likewise the case with calendars or advent decorations bonded to a window. Posters or pictures fixed to the wall in this way also become irreversible wall decoration as soon as the adhesive film tears off when pulled. The damage is considerable and the customer is lost. Even the use of still thicker adhesive films, as recommended by DE-OS 33 31 016, does not help to prevent such tears.

DE-PS 37 14 453 also discloses the use of such an adhesive film, called a strip tape therein, for allowing the non-destructive removal of training explosives from training objects. Here also, a tongue 6 is allowed to project out from the side of the adhesive joint; this tongue can be pulled in order to separate the bond again in this way. Tears also occur in this application in practice.

SUMMARY OF INVENTION

The object of the invention was to provide a hook or similar fixing device which on the one hand can be affixed easily, firmly and permanently, but on the other hand can be detached again simply, reliably and without damage to the bond substrate, without tears occurring during separation by pulling.

This object is achieved by a hook or the like as characterized in more detail in the claims.

The use of a covering which is opaque to UV on one end of the strip successfully prevents the occurrence of tears when the strip is pulled on for the purpose of separation. It is unclear whether this is due to the suppression of the development of the tiniest invisible damage to the film, caused by UV light, starting from which a crack can form during pulling and can propagate. At any rate, the result is convincing: there are no more tears. Neither was this deducible from the prior art, since precisely according to DE-OS 33 31 016, this problem was approached from a different direction, namely by making the adhesive film thicker. German Patent 37 14 453 did not even contain any hints at solving the problem.

Another advantage of the use according to the invention of a covering which is opaque to UV on one end of the strip lies in the fact that this covering at the same time serves as the tab for pulling. A more uniform transmission of force over the entire width of the adhesive film is thus possible, and peak stresses are reduced, the tendency to tear being reduced, especially on rough substrates. Prevention of tears during pulling is thus additionally assisted by this means.

It is furthermore advantageous that the adhesive film cannot achieve an excessive adhesive strength over a period of time in the region of the tab. Precisely in the case of extended bonding this firm attachment can present problems. On the one hand such an adhesive film can be detached from, for example, the wall only with difficulty, and on the other hand under tensile stress, such as occurs during pulling in the direction of the adhesion plane, especially in the case of partial bonding to rough substrates, for example woodchip wallpaper, the adhesive film can easily tear starting at the edge region and at the surface of the adhesive film. None of these problems occur according to the invention.

A hook according to the invention is preferably affixed in such a way that the peg of the hook is in the upper region, while the tab is directed downwards. If this tab is then pulled downwards, the hook separates from its substrate without residue, even from a wall with woodchip wallpaper. This is done in the same way as opening a zip fastener, or even better in the same way as opening a preserving jar.

The materials employed for the adhesive film can advantageously be those such as are described in DE-OS 33 31 016, as is the processing thereof. This ratio of peel strength to tear load of the adhesive film used according to the invention is greater than 1:1.5, but in particular 1:2 or more. The high elasticity (extendability) coupled with high tear strength as a general rule also correlates with low plasticity.

Suitable elastomers are, in particular, those of high tear strength and high elasticity.

Elastomers which can preferably be employed are block copolymers having blocks consisting of poly(- vinylaromatics) and blocks consisting of poly(1,3-dienes) or hydrogenation products thereof. The polyvinylaromatic blocks give the materials cohesive properties and therefore essentially control their tear strength. The polydiene blocks or the secondary products obtained from these by hydrogenation give the materials their elastic properties. Polystyrene is chiefly employed as the polyvinylaromatic, and the elastomer blocks used are preferably poly(butadiene) and poly(isoprene), and their hydrogenation products poly(ethylene-butylene) and poly(ethylene-propylene).

Three-block copolymers with polystyrene end blocks, abbreviated to S below, and an elastomer central block, abbreviated to D below (SDS three-block copolymers) are basically suitable. These can contain SD two-block copolymers. Linear $(SD)_n$-, radial and star-shaped $(SD)_nX$ multiblock copolymers, or also mixtures of several of the abovementioned block copolymers, are in principle also suitable.

The customary adhesive resins, such as, for example, hydrocarbon resins, polyterpene resins and terpene-phenolic resins, as well as colophony and colophony derivatives, can be employed as tackifying agents. Formulation follows the general rules.

The adhesive compositions can contain as further mixing components, inter alia:
Plasticizer oils.
Antiageing agents, for example in the form of antioxidants and UV stabilizers.
Fillers. Both inorganic and organic fillers, and in particular also pigments, can be a constituent of the formulation.
Crosslinking agents.

Suitable adhesive compositions can be processed from solution or dispersion, but preferably as a hot melt adhesive.

DETAIL DESCRIPTION

Figure 1:
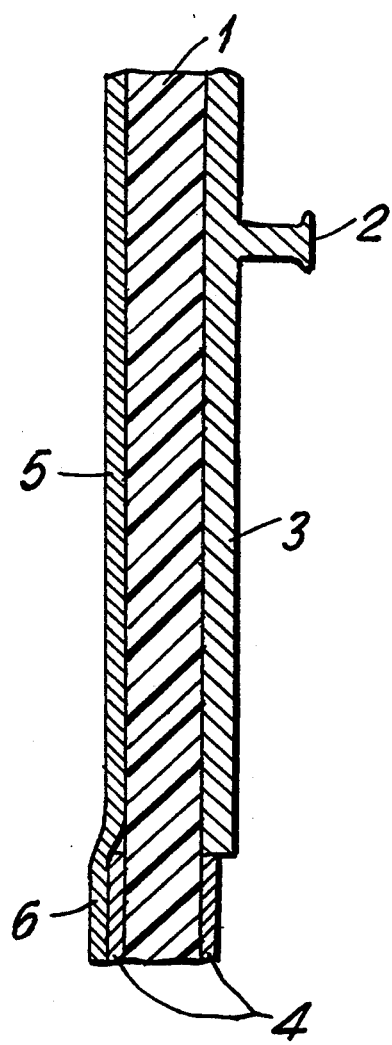
FIG. 1 is a longitudinal cross-section of the present invention.

The invention is to be described in more detail in the following example, without it being intended to limit it unnecessarily. All parts are by weight.

FIG. 1 shows a diagrammatic cross-section of an adhesive strip 1, which is provided in the lower region with a covering 4 as a tab. A baseplate 3 is applied on the front side to the adhesive strip above the covering 4, and carries a peg-like extension 2 in its upper region. The reverse of the adhesive strip is covered over its entire surface with a release paper or a release film 5, a part of which at the lower end serves as the tab 6.

Production of the Adhesive Film

EXAMPLE 1

| | |
|---|---|
| 51.5 parts | of linear SIS three-block copolymer having a block polystyrene content of 29% by weight and a hardness, measured by the Shore A method, of 60. (Vector 4211). |
| 47.0 parts | of partly hydrogenated aromatic C-9 hydrocarbon resin having a ring and ball softening point of 100° C. with an MMAP value of 58° C. and a DACP value of 16° C. (Regalite S 260). |
| 1.0 part | of phenolic antioxidant (Irganox 1010). |
| 0.5 part | of light stabilizer (polymeric sterically hindered amine) | are kneaded in a Sigma-blade mixer at +160° C. until homogeneity is achieved. The hot melt adhesive composition thus obtained is coated at +160° in a coating thickness of 410 μm via a slot die onto an 80 μm thick release film of monoaxially stretched polypropylene siliconized on both sides.

| | |
|---|---|
| - thickness of the adhesive composition | 410 μm |
| - tear strength* | 3.9N/mm² |
| - elongation at break* | 1110% |
| - adhesive strength** | about 7N/cm |
| - shear stability*** | >20,000 min |

*Stretching rate: 300 mm/min; sample length: 100 mm
**Steel, peel-off angle: 90°, peel-off rate: 300 mm/min, adhesive tape laminated on 25 μm PETP film
***Steel, adhesion surface: 13 × 20 mm², temperature = RT, 20N shear load.

EXAMPLE 2

| | |
|---|---|
| 25.5 parts | of linear SBS three-block polymer having a block polystyrene content of 29% by weight and a hardness, measured by the Shore A method, of 65. (Vector 4261) |
| 26.0 parts | of linear SIS three-block polymer having a block polystyrene content of 29% by weight and a hardness, measured by the Shore A method, of 60. (Vector 4211) |
| 47.0 parts | of the pentaerythritol ester of hydrogenated colophony having a ring and ball softening point of 101° C. and an acid number of 12. (Pentalyn H-E) |
| 1.0 part | of phenolic antioxidant (Irganox 1010) |
| 0.5 part | of light stabilizer (polymeric sterically hindered amine) | are processed as under Example 1 and brushed in a coating thickness of 400 μm onto the release film described under Example 1.

| | |
|---|---|
| - thickness of the adhesive composition | 400 μm |
| - adhesive strength** | about 15.0N/cm |
| - shear stability*** | >10,000 min |

, *see under Example 1.

EXAMPLE 3

| | |
|---|---|
| 51.5 parts | of linear SIS three-block polymer having a block polystyrene content of 29% by weight and a hardness, measured by the Shore A method, of 60 (Vector 4211) |
| 47.0 parts | of the pentaerythritol ester of hydrogenated colophony having a ring and ball softening point of 101° C. and an acid number of 12. (Pentalyn H-E) |
| 1.0 part | of phenolic antioxidant (Irganox 1010) |
| 0.5 part | of light stabilizer (polymeric sterically hindered amine) | are processed as under Example 1 and brushed in a coating thickness of 600 μm onto the release film described under Example 1.

| | |
|---|---|
| - thickness of the adhesive composition | 600 μm |
| - adhesive strength** | about 25N/cm |

| | |
|---|---|
| -continued | |
| - shear stability*** | >10,000 min |
| - elongation at break* | 1110% |
| - tear strength* | 4.1N/mm² |

*, , *see under Example 1

EXAMPLE 4

| | |
|---|---|
| 40.0 parts | of linear SEBS three-block polymer with 40% by weight of SEB two-block copolymer, a block polystyrene content of 13% by weight and a hardness, measured by the Shore A method, of 65. (Kraton G 1657) |
| 50.0 parts | of the pentaerythritol ester of hydrogenated colophony having a ring and ball softening point of 101° C. and an acid number of 14. (Foral 105-E) |
| 10 parts | of an aliphatic oil (V 7047, Shell) |
| 1.0 part | of phenolic antioxidant |
| 0.5 part | of light stabilizer (polymeric sterically hindered amine) | are processed as under Example 1 and brushed in a coating thickness of 500 μm onto the release film described under Example 1.

SEBS-based adhesive compositions are particularly suitable if high ageing resistance requirements are imposed.

Production of Hooks

Bale goods from Examples 1-4 (comprising double-sided adhesive tape with a release film or release paper covering on one side) are processed on a line comprising two laminating stations, one delaminating station, a further laminating station, a longitudinal cutting device and a separating unit (stamping press) to give sheet goods (strips) onto which a baseplate corresponding to FIG. 1 having an integrated peg is applied.

To this end, a pigmented polyethylene terephthalate film 20 mm wide and 15 μm thick is laminated centrally on the side of bale goods 120 mm wide which is free from release film (front side) at the first laminating station. Siliconized polyethylene release film 125 mm wide is laminated on at the second laminating station in such a way that the release film projects over both sides of the adhesive composition by about 2.5 mm. After the release film covering of the reverse has been removed in a delaminating station, polyethylene terephthalate film 20 mm wide is laminated centrally onto the reverse. Separation to give sheet goods 62.6 mm long and 19 mm wide is achieved by cutting (in the longitudinal direction) and by stamping on a format stamping press. A plastic hook corresponding to FIG. 1, comprising a baseplate with an integrated peg, is applied to the stamped-out piece thus produced.

Alternatively, strips which are provided with a tab and release film on both sides can be used as the starting material. Before application of the hook comprising the baseplate and integrated peg, one release film is to be removed accordingly and the strips of adhesive tape are to be bonded onto the reverse of the baseplate.

I claim:

1. A detachable self-adhesive assembly comprising in combination
   a) A baseplate (3) having a front and back with a peg-like extension (2) on the front,
   b) a strip (1) having an adhesive front and back for mounting onto a surface, and said strip being of an adhesive composition based on a thermoplastic rubber and tackifying resins, the strip having high elasticity and low plasticity and exhibiting adhesion or adhesive power lower than cohesion of said strip, whereby said adhesive power substantially weakens upon elongation of said strip, the ratio of the strip peel strength to the strip tear strength being at least 1:1.5, the front of the strip adhering to the back of the baseplate,
   c) a covering (4) provided on a portion of the front and back of said strip so as to form a pulling tab to facilitate removal of said strip from said surface,
   d) a release layer (5) adhered on the back of said strip (1), said layer having a tab (6) adjacent said covering (4),
whereby said release layer (5) can be removed so that the rear of said strip (1) can be affixed to a surface and, said strip can be detached from said surface upon pulling of said covering (4) so that said strip (1) elongates causing the strip to weaken said adhesive power to said surface, and resulting in the hook assembly being detached from said surface.

2. An assembly according to claim 1, wherein the baseplate (1) and the peg-like extension (2) are formed of plastic or metal.

3. An assembly according to claim 1, wherein the strip (1) contains at least one of an antioxidant, UV stabilizer, dye or filler.

4. An assembly according to claim 1, wherein the strip (1) is about 0.2 to 1.2 mm thick.

5. An assembly according to claim 1, wherein the ratio of the peel strength to the tear strength for the strip (1) is from about 1:1.5 to 1:5.

6. An assembly according to claim 1, wherein the strip (1) is formed of a composition which was hot kneaded and extruded.

7. An assembly according to claim 1, wherein the tab formed by the covering (4) is about 25 mm long and about 10 to 40 mm wide.

8. An assembly according to claim 1, wherein the covering (4) comprises a lacquered or pigmented plastic film.

9. An assembly according to claim 1, wherein the tab formed by the covering (4) is about 25 mm long and about 18 to 20 mm wide.

10. An assembly according to claim 1, wherein the covering (4) comprises a lacquered or pigmented plastic film of a different color than the baseplate (3).

* * * * *